No. 841,134. PATENTED JAN. 15, 1907.
J. FERGUSON.
MILK BUCKET.
APPLICATION FILED AUG. 13, 1906.
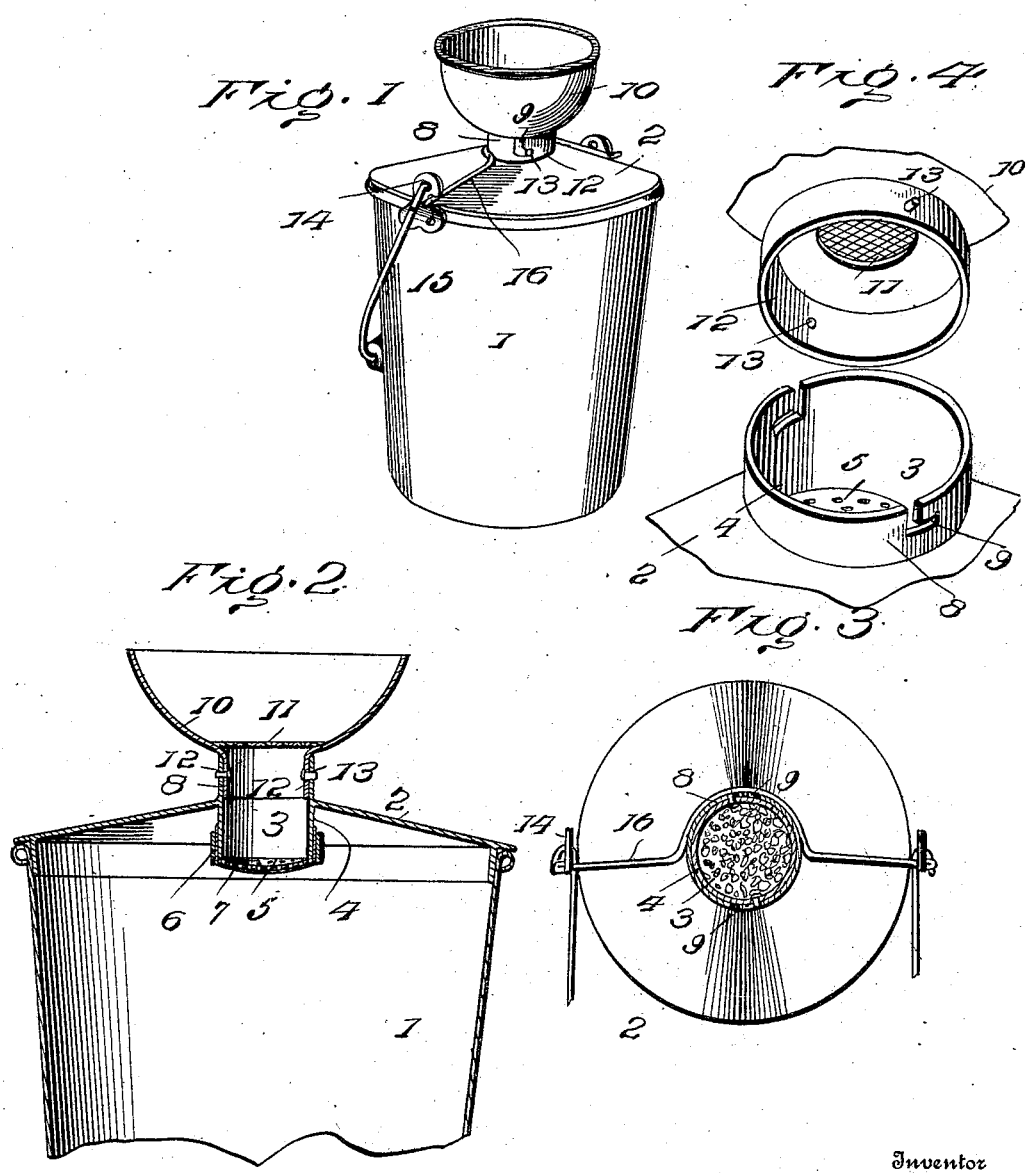
Inventor
J. Ferguson
By R. A. P. Lacy,
Attorneys
Witnesses
J. Innie
W. N. Woodson.

UNITED STATES PATENT OFFICE.

JESSE FERGUSON, OF HOYTSVILLE, OHIO.

MILK-BUCKET.

No. 841,134.     Specification of Letters Patent.     Patented Jan. 15, 1907.

Application filed August 13, 1906. Serial No. 330,445.

*To all whom it may concern:*

Be it known that I, JESSE FERGUSON, a citizen of the United States, residing at Hoytsville, in the county of Wood and State of Ohio, have invented certain new and useful Improvements in Milk-Buckets, of which the following is a specification.

The object of my invention is to provide improved means for straining and filtering milk by means of granular material; and the invention consists of improved filtering means embodied in a chamber centrally located in the lid or cover designed to fit over milk-pails, the invention, preferably, also comprehending improved construction of the parts that combine to make up the filter or straining device, all as will be hereinafter fully described, and particularly pointed out in the appended claim.

For a full description of the invention and the merits thereof and also to acquire a knowledge of the details of construction of the means for effecting the result reference is to be had to the following description and accompanying drawings, in which—

Figure 1 is a perspective view of my improved filtering apparatus for milk-pails. Fig. 2 is a vertical longitudinal section upon an enlarged scale. Fig. 3 is a horizontal sectional view. Fig. 4 is a detail perspective view with parts shown detached from each other.

Corresponding and like parts are referred to in the following description and indicated in all the views of the drawings by the same reference characters.

Referring to the drawings, the numeral 1 designates a milk-pail, which may be of any desired construction or design except in certain particulars hereinafter noted.

2 designates the lid or cover that is adapted to fit down over the pail to form a closure therefor, and said lid is provided with a chamber 3, which is centrally located in the present instance and is produced by means of a central opening surrounded by a depending cylinder 4, having a foraminous or perforated bottom 5. The chamber 3 is intended to contain gravel or similar granular or pulverulent material through which the milk is intended to percolate and be discharged into the pail. After the milk passes through the granular substance in the chamber 3 it passes through the foraminated bottom 5 of the chamber and also preferably through a straining-cloth 7, which may be held against the bottom 5 by means of a detachable ring 6, adapted to fit with frictional engagement around the cylinder 4.

Surrounding the mouth or upper opening of the chamber 3 is an upwardly-extended flange 8, provided at diametrically opposite points with bayonet-slots 9.

10 designates a bowl into which the milk flows as the cow is being milked, and said bowl is formed in its bottom with a screen 11, of wire mesh or similar material. A depending flange 12 surrounds the opening in which the screen 11 is located, and said flange is provided with studs 3, adapted to enter the bayonet-slots 9 so as to detachably connect the bowl to the lid or cover 2. The flange 12 of the bowl fits snugly within the flange 8 of the lid 2, and the screen of the bowl in effect forms a top or cover for the filtering-chamber 3.

If desired, the bail-ears 14 of the pail 1 may be provided with sockets 15, adapted to receive the ends of a yoke-bar 16, which partially encircles the collar or flange 8 of the lid and holds the lid securely on the pail.

From the foregoing description, in connection with the accompanying drawings, it will be seen that I have provided an improved construction or filtering and straining device for milk which will insure that the milk finally flowing into the pail will be thoroughly cleansed of all solid impurities.

Having thus described the invention, what is claimed as new is—

A lid for milk-pails provided with a depending cylinder formed with a foraminous bottom and constituting a filtering-chamber and an upwardly-extending collar or flange surrounding the upper end of said filtering-chamber, the filtering-chamber being adapted to contain granular material, and a bowl provided in its bottom with a screen and also provided below the screen with a depending flange arranged for detachable engagement with the said collar of the lid, whereby the said screen will form the top of the filtering-chamber, as and for the purpose set forth.

In testimony whereof I affix my signature in presence of two witnesses.

JESSE FERGUSON. [L. S.]

Witnesses:
     JOSEPH HERRINGSHAW,
     JAMES A. TINNEY.